Oct. 31, 1933.                F. L. SCOTT                1,932,488
              MEANS FOR MOUNTING REAMER BLADES
                 Filed Oct. 5, 1931        2 Sheets-Sheet 1
FIG. 1
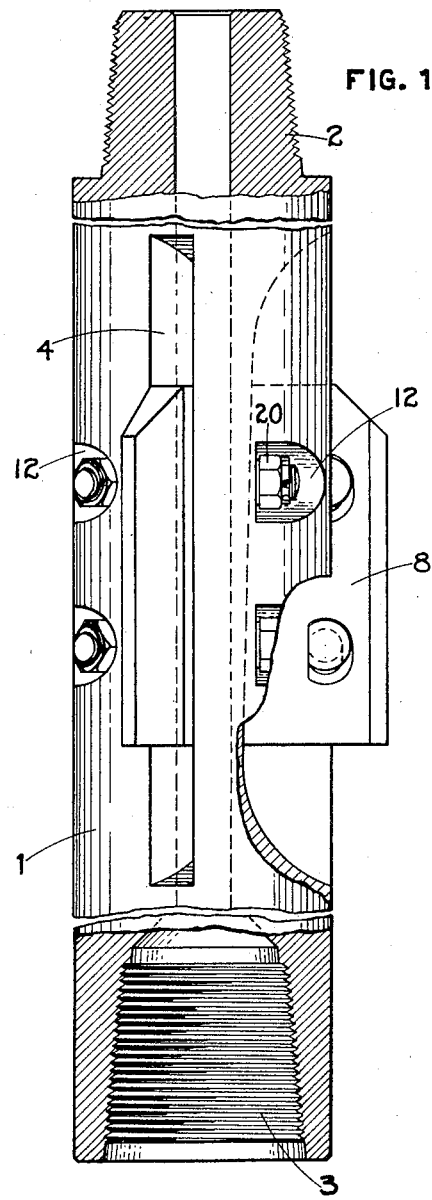
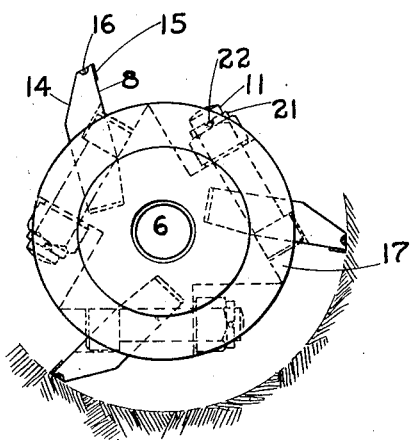
FIG. 2
FLOYD L. SCOTT INVENTOR
BY Jesse R. Stone
ATTORNEY

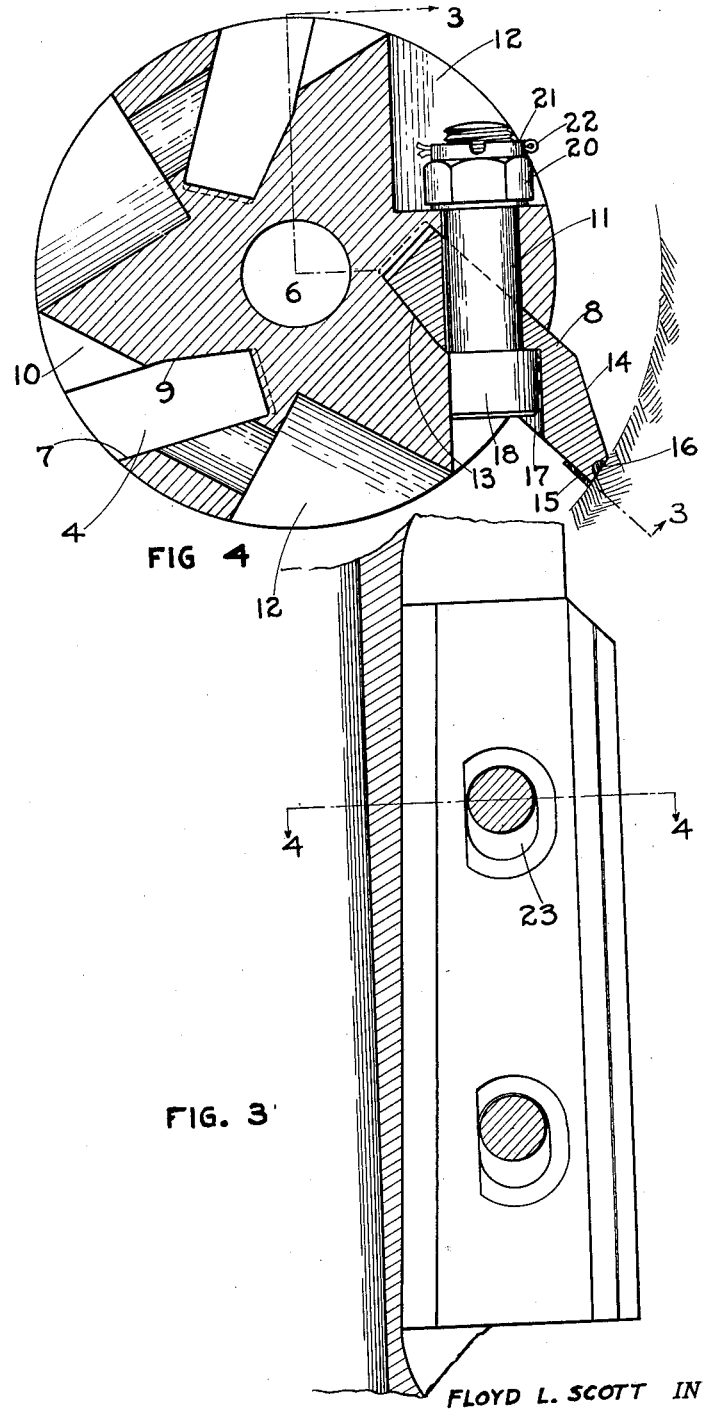

Patented Oct. 31, 1933

1,932,488

UNITED STATES PATENT OFFICE 1,932,488

MEANS FOR MOUNTING REAMER BLADES

Floyd L. Scott, Houston, Tex., assignor to Hughes Tool Company, Houston, Tex., a corporation of Texas Application October 5, 1931. Serial No. 567,029

2 Claims. (Cl. 255—73)

This invention relates to the securing of cutting blades within the body of a holder or head and is intended particularly for use in well drilling devices.

The invention may be employed with drills or reamers and an object is to secure the blades in position so that they will not tend to loosen and vibrate in operation.

I desire to construct the head and the cutters so that when the blades are fitted in the holder, the blades will tend to wedge more firmly in position as the drill is operated.

The invention also resides in the simple manner in which the replaceable blades may be secured in position.

In the drawings herewith, Fig. 1 is a side view, mostly in elevation of a reamer involving this invention.

Fig. 2 is a plan view of the assembled device, illustrating the tool in position relative to the walls of the well.

Fig. 3 is an enlarged section on the line 3—3 of Fig. 4.

Fig. 4 is a transverse section through the device, taken on the line 4—4 of Fig. 3.

The invention is illustrated as applied to a well reamer, having a head 1 of cylindrical shape. The upper shank 2 is threaded for engagement with a collar connecting the device to a drill stem. The lower end is provided with a threaded socket or box 3 for engagement with the drill head, not shown.

The sides of the head 1 are cut at spaced intervals with deep grooves or recesses 4, best shown in Fig. 4. These recesses are cut at an angle to the radius of the head, the direction being approximately tangent to the central watercourse 6.

The rearward side of the recess is flat at 7 to bear against the rear of the blade 8. The forward side 9 is inclined slightly relative to the side 7 to provide a small taper to the recess so that the blade may be wedged therein. The outer portion of the recess is cut away at spaced points, as shown at 10 to receive the bolts 11, by means of which the blades are secured in position.

The head also has recesses 12 to receive the ends of the bolts, said recesses being coaxial with the recesses 10.

The blades 8 are shown as reaming blades, and may be of the desired length. The inner portion of each blade is tapered somewhat in thickness to engage within the recesses 4. This taper is produced by beveling the forward side at 13 (see Fig. 4). The rearward side of the blade is beveled toward the outer cutting edge at 14, and the said cutting edge is preferably faced with hard material, such as tungsten carbide, at 15 and 16. The forward face is recessed at 17 to receive the heads of the bolts 11.

Said bolts 11 have the heads 18 flattened on their inner sides to fit against the flattened faces of the recesses 10, and prevent rotation of the bolts. Nuts 20 on the bolts may be held in position by cotter pins 22, extending through the castellated ends 21 thereon.

It will be seen that the bolts extend through the cutter blades at such an angle as to tend to draw the blades into their recesses when the nuts are tightened on to the bolts. I have shown two bolts to each blade, but the number of bolts will depend upon the desired length of blade.

By setting the blades at the angle shown there is a component of force due to the cutting of the wall of the hole which will force the blade deeper into its socket. With the socket tapered, a wedging action is obtained which tends to hold the blade firmly and prevent chatter or vibration in use.

As will be seen from Fig. 3, the blades may also be tapered upwardly and the openings 23 in the blades which receive the bolts may be elongated so as to allow a slight longitudinal movement of the blade to take up for wear which may take place in use. The downward movement of the head will cause an upward thrust of the formation upon the lower end of the blade tending to wedge the blade upwardly in the slot 4, thus also acting to prevent loosening of the blades.

By mounting of the cutter blades in this manner, I am assured of a uniform cutting action of the blades and the blades will not become loosened or be subjected to excessive wear due to chatter or vibration of the blade in its socket. The invention is capable of application to well drills and other cutting tools.

What I claim as new is:

1. In a device of the character described, a head, longitudinal recesses therein tapered inwardly and upwardly, blades shaped to fit said recesses and to be wedged in the same by the operation of said head and bolts extending diagonally through said blades and acting, when tightened, to force said blades inwardly.

2. A reamer including an approximately cylindrical head, radial recesses longitudinally of said head, said recesses being tapered inwardly and their depths decreased upwardly, blades shaped to fit said recesses, and bolts extending through said head and said blades at an acute angle relative thereto whereby the tightening of said bolts draws said blades inwardly and wedges said blades in said recesses, the weight on said head tending to tighten said blades upwardly.

FLOYD L. SCOTT.